(12) United States Patent
Flemming et al.

(10) Patent No.: US 8,578,388 B2
(45) Date of Patent: Nov. 5, 2013

(54) OPTIMIZING THE PERFORMANCE OF HYBRID CPU SYSTEMS BASED UPON THE THREAD TYPE OF APPLICATIONS TO BE RUN ON THE CPUS

(75) Inventors: Diane Flemming, Austin, TX (US);
Greg R. Mewhinney, Austin, TX (US);
David B. Whitworth, Austin, TX (US);
Randal C. Swanberg, Austin, TX (US);
Eric P. Fried, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 12/911,102

(22) Filed: Oct. 25, 2010

(65) Prior Publication Data
US 2012/0102499 A1   Apr. 26, 2012

(51) Int. Cl.
*G06F 9/455* (2006.01)
*G06F 9/46* (2006.01)

(52) U.S. Cl.
USPC .............. 718/105; 718/1; 718/100; 718/101; 718/102

(58) Field of Classification Search
None
See application file for complete search history.

(56) References Cited

U.S. PATENT DOCUMENTS

| 5,784,599 | A  | * | 7/1998  | Elkhoury ............... 713/501 |
| 6,298,448 | B1 |   | 10/2001 | Shaffer et al. |
| 6,691,242 | B1 |   | 2/2004  | Pollock et al. |
| 7,469,355 | B1 |   | 12/2008 | Chong |
| 7,536,578 | B2 |   | 5/2009  | Pessolano |
| 2005/0060597 | A1 | * | 3/2005 | Albonesi et al. ......... 713/600 |

OTHER PUBLICATIONS

Kumar et al. Core Architecture Optimization for Heterogeneous Chip Multiprocessors. [online] (2006). ACM, pp. 23-32. Retrieved From the Internet <http://dl.acm.org/ft_gateway.cfm?id=1152162 &ftid=374225&dwn=1&CFID=167719058 &CFTOKEN=17758562>.*
Farkas et al. Processor Power Reduction Via Single-ISA Heterogeneous Multi-Core Architectures. [online] (2003). IEEE, pp. 1-4. Retrieved From the Internet <http://ieeexplore.ieee.org/stamp/stamp.jsp?tp=&arnumber=1650116>.*
Zhong et al. Extending Multicore Architectures to Exploit Hybrid Parallelism in Single-thread Applications. [online] (Feb. 2007). IEEE, pp. 25-36. Retrieved From the Internet <http://ieeexplore.ieee.org/stamp/stamp.jsp?tp=&arnumber=4147645>.*

* cited by examiner

*Primary Examiner* — Emerson C. Puente
*Assistant Examiner* — Jonathan R Labud
(74) *Attorney, Agent, or Firm* — J. B Kraft; David A. Mims

(57) ABSTRACT

A hybrid CPU system wherein the plurality of processors forming the hybrid system are initially undifferentiated by type or class. Responsive to the sampling of the threads of a received and loaded computer application to be executed, the function of at least one of the processors is changed so that the threads of the sampled application may be most effectively processed/run on the hybrid system.

12 Claims, 4 Drawing Sheets

OPTIMIZING THE PERFORMANCE OF HYBRID CPU SYSTEMS BASED UPON THE THREAD TYPE OF APPLICATIONS TO BE RUN ON THE CPUS

CROSS-REFERENCE TO RELATED PATENT APPLICATION

Copending patent application Ser. No. 12/427,746, filed Apr. 22, 2009, which is assigned to the same assignee as the present invention, covers subject matter related to the subject matter of the present patent application and is hereby incorporated by reference.

TECHNICAL FIELD

The present invention relates to hybrid CPU systems and, particularly, to the running of computer application threads effectively on such hybrid CPU systems.

BACKGROUND OF RELATED ART

Hybrid CPU systems are a new and evolving type of computer system involving virtual processor platforms including a plurality of virtual machines implemented on the core processors in multicore platforms; each processor respectively connected to one of a plurality of client devices that provide application threads to be executed on the processor cores. Such a hybrid CPU system may be described as a general purpose computer system characterized in that it includes two or more central processing units (CPUs), each with different types of performance characteristics. For example, a hybrid system may include encryption/decryption processors, floating point performance processors or multiple general propose processors with different performance levels. The above cross-referenced patent application addresses the optimization in the dispatching of threads from multithreaded applications to be executed on the hybrid processor cores. The cross-referenced patent application is directed to the analysis of each thread in a multithreaded computer application so that the thread could be dispatched to the appropriate type of processor core in the hybrid system. The cross-referenced patent application involves loading the multithreaded application received for execution into the memory of the hybrid system and performing a static performance analysis of the thread on one of the processors, whereby each thread was classified to be run on one particular type or class of hybrid processors. During the application run, the threads were dispatched based upon their classifications and a similar runtime analysis was subsequently performed on the threads to determine if the classification of each running thread still matched its static classification and appropriate changes in dispatching were made in the event that the runtime classification no longer matched.

SUMMARY OF THE PRESENT INVENTION

The present invention is also directed to a hybrid (CPU) processor system. However, this invention relates to a hybrid system wherein the plurality of processors forming the hybrid system are initially undifferentiated by type or class, i.e. all of the processors initially have substantially the same functionality and the same power. Then, responsive to the sampling of the threads of a received and loaded computer application to be executed, the function of at least one of the processors is changed so that the threads of the sampled application may be most effectively processed and run on the hybrid system.

To this end, the present invention provides a system, method and computer program for optimizing the performance of application programs in hybrid CPU systems having a plurality of CPUs that comprises loading an application program into a hybrid CPU system and sampling said loaded application program to determine whether the application program is single threaded or multithreaded. As a result of the sampling, a multithreaded application program is run on a first CPU and a single threaded application program is run on a second CPU. However, the second CPU is run at a higher speed than said first CPU.

Single threaded computer applications tend to block less and spend less time waiting on external events (I/O and request/response) than do multithreaded applications. Thus, by running the faster running single threaded applications on the higher speed CPUs (processors) and the slower multithreaded applications on lower or normal speed CPUs, performance is optimized. Thus, it is no longer necessary to make all processors in a multiprocessor system power hungry to accommodate the speed of the single threaded applications being run in the hybrid system.

The sampling of the stored or loaded application is initially carried out as a static analysis of the threads in the application program being sampled. The first and second processors have the same performance capacity and, as a result of this initial static sampling, the speed of the second CPU on which the single threaded application is to be run is increased.

Then, during the run time of the application program threads on their appropriate processors, the threads of the applications are dynamically sampled. As a result of the sampling of the running application, if the thread type of the single or multithread type of the application has changed, then the speed of the CPU on which the application is being run may be changed or the application may be switched to a processor running at a higher speed if the running application is found to be single threaded.

In accordance with an embodiment of the invention, the running speed of the second CPU is increased by increasing bus ratios in said second CPU.

In accordance with a further embodiment, the hybrid CPU system comprises a plurality of CPUs of the same performance capacity including said first and second CPUs, and the embodiment further includes reducing the speed of a CPU on which a multithreaded application program is run by reducing bus ratios in the CPU. An aspect of this embodiment may involve predicting thermal power conditions of the hybrid CPU system; and reducing bus ratios in the CPU on which the multithreaded application is being run responsive to the predicting.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
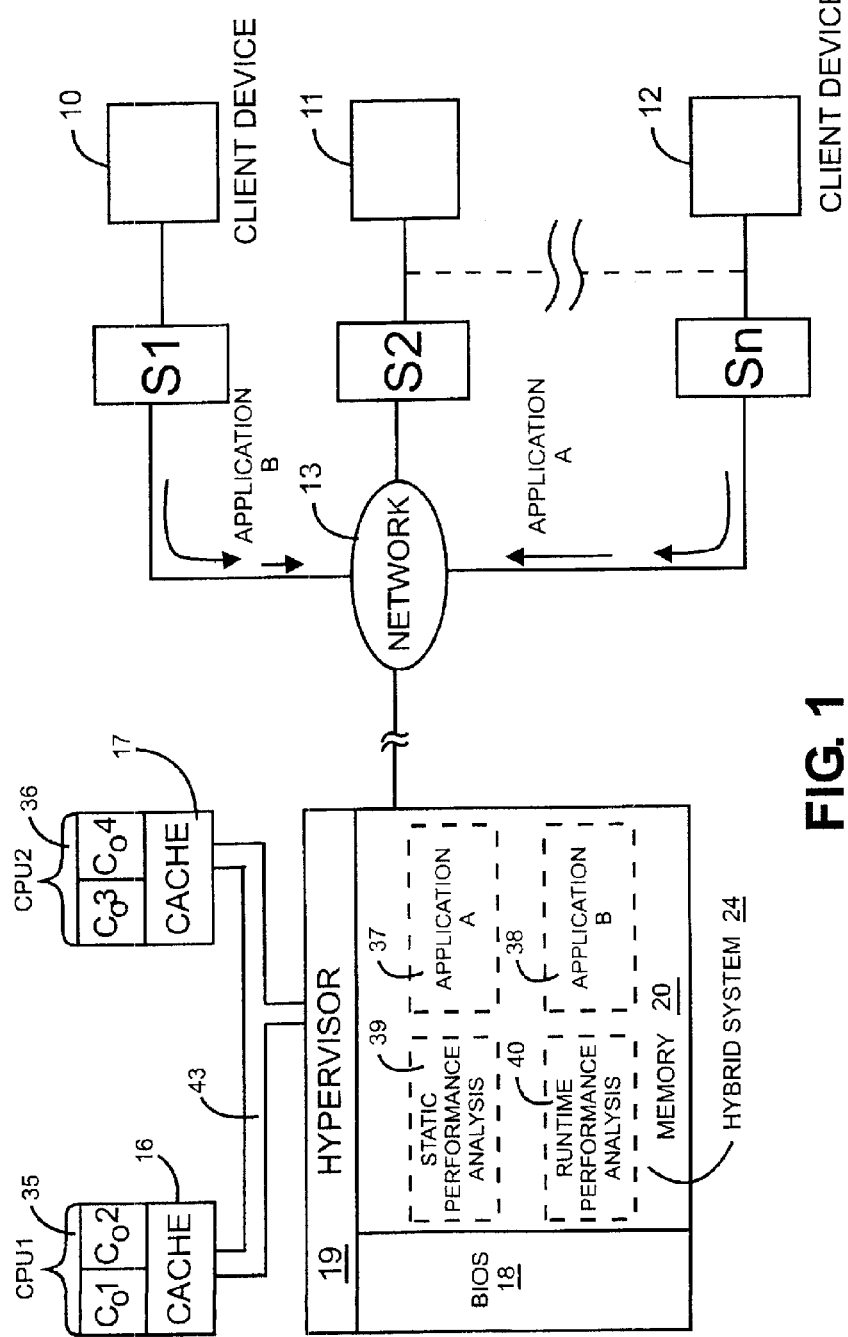
FIG. 1 is a generalized diagrammatic view of a network portion, including a pair of dual core processors and a plurality of remote user computers or client devices connected to physical cores in the hybrid system that may be used in the practice of the present invention.

Referring to FIG. 1, there is shown a generalized diagrammatic view of a network portion, including a pair of dual core processors and a plurality of remote user computers or client devices connected to physical cores in the hybrid system. The hybrid CPU system shown in FIG. 1, which has been simplified for purposes of illustration, consists of hybrid system platform 24, supports a pair of dual core CPUs (1 and 2) 35 and 36. Each CPU respectfully includes a set of two cores Co1-Co2 and Co3-Co4 and each core set having a respective shared cache 16-17. The client devices providing the application threads to be run on the cores Co1-Co4 may be desktop computers 10-12, respectively connected to the hybrid system 24 through respective network servers S1-Sn via a network 13, such as the Internet. All of the distribution of the application threads to cores Co1-Co4 are controlled by hypervisor 19, supported by BIOS 18 and memory 20. In this function, hypervisor 19 controls the dispatching of application threads to the CPUs 35 and 36 via bus 43. The implementation of this invention is through a computer program run in hypervisor 19 that may be stored in the BIOS 18 or in memory 20 or a combination of both controlled by hypervisor 19. In this illustration, an Application B from client device 10 is transmitted for execution on the hybrid system 24 wherein it is stored 38 in memory 20. Likewise, an Application A from client device 12 is transmitted for execution on the hybrid system 24 wherein it is stored 37 in memory 20. Applications A and B are stored and processed, at least partially, and preferably entirely in the binary state. Also loaded into the memory 20 are a static performance analysis program 39 and a runtime analysis program 40. Thus, when Application B 38 is loaded into memory and before it is run on a CPU, as will be described hereinafter in greater detail, a static performance analysis is carried out on the threads of Application B to determine whether Application B is single threaded or multithreaded. If the result is that Application B is single threaded, it is selectively sent to CPU 1 or 2, which initially are of the same type, i.e. undifferentiated as to function or processing power. Assuming that Application B is assigned to CPU 2, because Application B is single threaded, according to this aspect of the present invention, CPU 2 will be run at increased speed. Thus, when CPU 2 (36) is brought online to execute the threads of Application B, the bus speed of the cores of CPU 2 are increased. Since processor speed is a multiple of bus speed, this may be done by setting the multiplier associated with CPU 2 to an appropriate multiple, i.e. higher bus ratio. This approach is similar to overclocking the CPU.

It should be emphasized that this aspect of the invention provides an implementation wherein a hybrid CPU system with differentiated CPUs may be created from a system of a plurality of CPUs initially undifferentiated in speed or performance type.

In accordance with an aspect of this invention, it would applicable to an already operative hybrid CPU system wherein some of the processors are already running at increased processor speeds. In such a situation, a received application may be sampled in an information mode by the static performance analyzer program 39 and if it is determined that the application is single threaded, it may be assigned to a CPU 2, which is already running in the increased speed mode. In this manner, once the hybrid system is differentiated, the application may be bound to the higher speed CPU or a logical partition may be created and dispatched to targeted CPUs.

With respect to the static performance analysis program 39, it operates as a simplification of the static analysis program of the above cross-referenced patent application Ser. No. 12/427,746. The analysis program 39 only needs to determine whether the application program is single or multithreaded when run in the static or information mode.

In accordance with a further aspect of this invention, the running application program made be sampled by the runtime performance analyzer to determine if the single or multithread type of the application has changed, and the CPU on which the application is being run may be changed responsive to a thread type change. Such a change may come about when a particular application being executed changes from single thread to multithread or from multithread to single thread.

In accordance with another aspect of this invention, the speed of a CPU on which a multithreaded application program is run may be reduced by reducing bus ratios in the CPU. For example, Application A 37 is a multithreaded application and is dispatched for execution on CPU 1 (35) on a CPU that is running at its normal speed. Since the processing capacity required for execution of Application A is relatively low, the bus ratios and consequent speed of CPU 1 may be reduced to reduce thermal power and the needs for its dissipation in the hybrid CPU system. In a typical situation, there would be predicting of thermal power conditions of the hybrid CPU system and the bus ratios in said CPU on which said multithreaded application is being run would be reduced responsive to said predicting.

This approach presents an alternative to the TPMD hardware devices used in International Business Machine Corporation's Power Systems Management Device (TPMD) that monitors power consumption in the cores of CPUs 1 and 2. In TPMD, total power consumption is monitored in TPMD on a realtime basis and regulated relative to predetermined parameters by increasing or reducing processor frequencies so that the overall power consumption is reduced or maintained. In accordance with the present invention, the thread analysis and the running of the CPU cores at higher or lower frequencies/speeds may be used to predict thermal power conditions in the processor cores and to take preventive or prognostic action by respectively "overclocking" or "underclocking" the CPU processors, rather than on a fully realtime monitoring basis as in TPMD devices.

Figure 2:
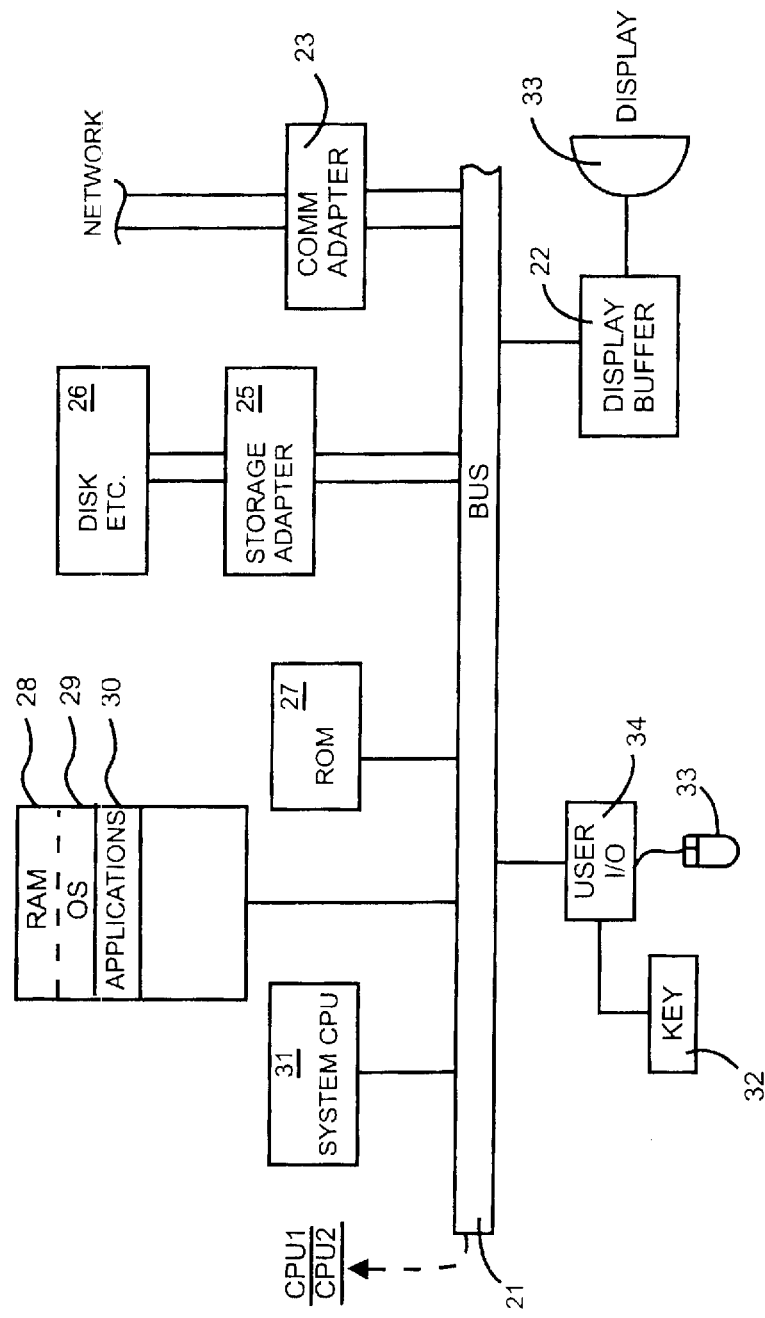
FIG. 2 is an illustrative diagrammatic view of a control processor that may be used for the platform hypervisor of FIG. 1, as well as for the servers for the client devices shown in FIG. 1.

With respect to FIG. 2, there is shown an illustrative diagrammatic view of a control processor that may be used for the hypervisor 19 of FIG. 1, or for any of the client device servers S1-Sn. A central processing unit (CPU) 31, such as one of the microprocessors. e.g. from the System p series available from International Business Machines Corporation (IBM), is provided and interconnected to various other components by system bus 21. An operating system (OS) 29 runs on CPU 31, provides control and is used to coordinate the function of the various components of FIG. 2. OS 29 may be one of the commercially available operating systems. Application programs 30, controlled by the system, are moved into and out of the main memory Random Access Memory (RAM) 28. These programming applications may be used to implement functions of the present invention. Alternatively, the programs used to implement the present invention will be in the Basic Input/Output System (BIOS) of the controlling hypervisor stored in a Read Only Memory (ROM) 27 connected to CPU 31 via bus 21. ROM 27 includes the BIOS that controls the basic computer functions of the hypervisor. RAM 28, storage adapter 25 and communications adapter 23 are also interconnected to system bus 21. Storage adapter 25 communicates with the disk storage device 26. Communications adapter 23 interconnects bus 21 with an outside Web or like network. I/O devices are also connected to system bus 21 via user interface adapter 34. Optionally, keyboard 32 and mouse 33 may be connected to bus 21 through user interface adapter 34, where a display is used, display buffer 22 supports display 33.

Figure 3:
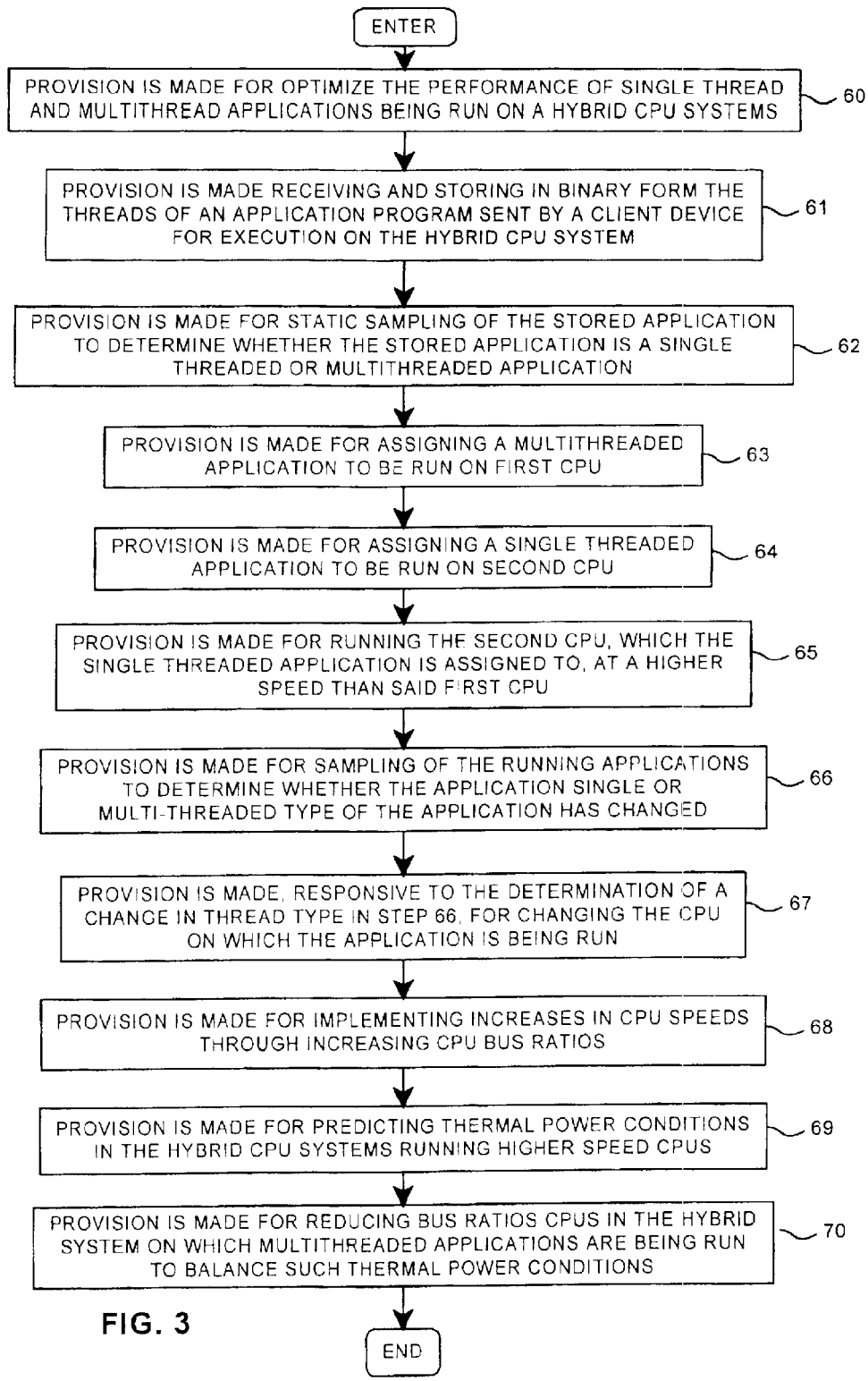
FIG. 3 is a general flowchart of a program set up to implement the present invention for maximizing the performance of application programs in hybrid CPU systems.
Figure 4:
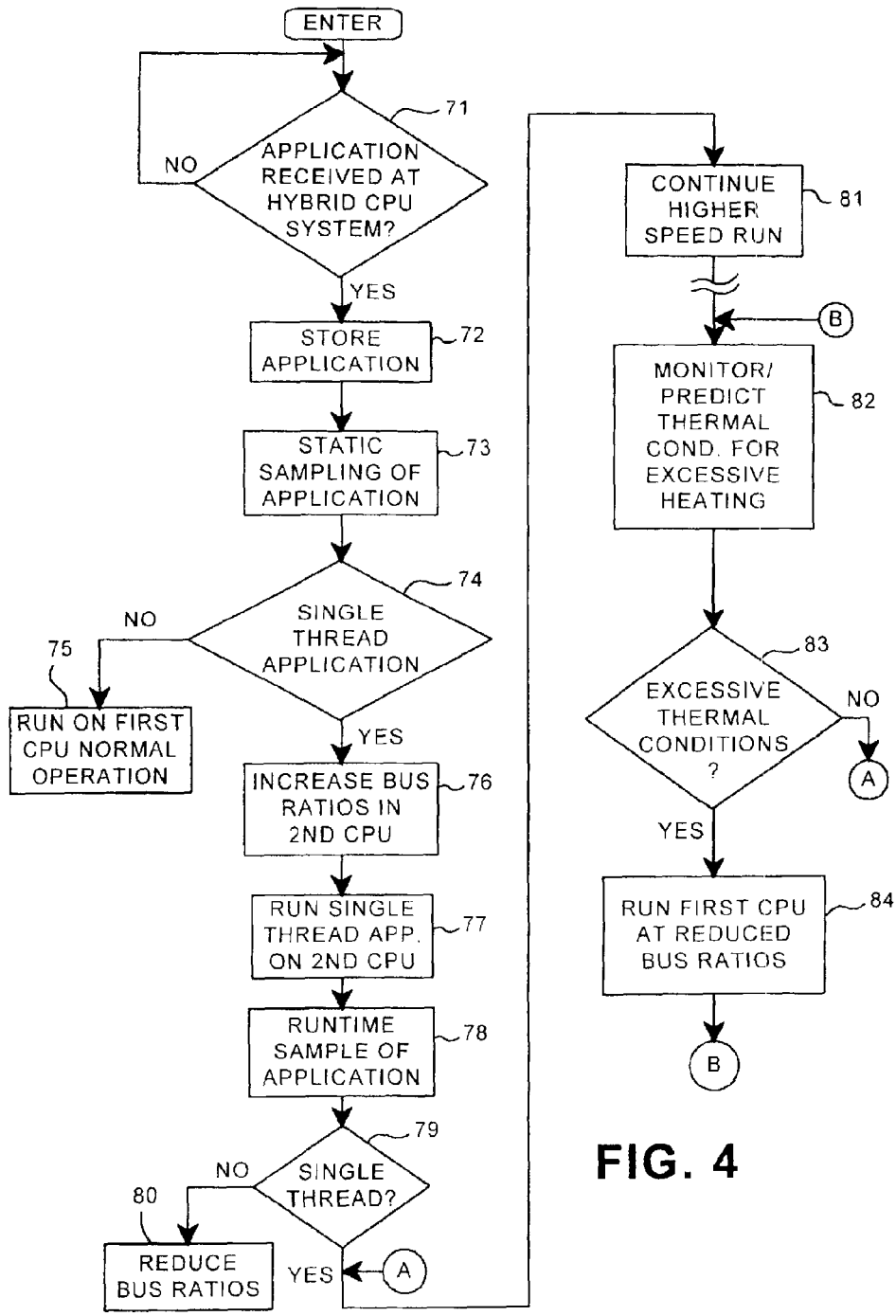
FIG. 4 is a flowchart of an illustrative run of the program set up in FIG. 3.

FIG. 3 is a general flowchart of an illustrative program set up to implement the present invention for maximizing the performance of application programs in hybrid CPU systems. Provision is made for optimizing the performance of single thread and multithread applications being run on hybrid CPU systems, 60. Provision is made for receiving and storing, in binary form, the threads of an application program sent by a client device for execution on the hybrid CPU system, 61. Provision is made for the static sampling of the stored application to determine whether the stored application is a single threaded or multithreaded application 62. Provision is made for the assigning of a multithreaded application to be run on a first CPU 63. Provision is made for the assigning of a single threaded application to be run on a second CPU, 64. Provision is made for the running of the second CPU at a higher speed than the first CPU 65. Provision is made for the sampling of the running application to determine whether the application type (single or multithreaded) has changed 66. Provision is made, responsive to a determination of a change in thread type, for changing the CPU on which the application is being run 67. This may involve either changing the speed of the CPU on which the application is being run or moving the application to another CPU. Provision is made for implementing, increases in CPU speeds through increasing CPU bus ratios 68. Provision is made for predicting thermal power conditions based upon the number of CPUs running at increased speeds and the extent of the increases in the respective CPU bus ratios 69. Provision is made for reducing bus ratios in the hybrid system on which multithreaded applications are being run to reduce thermals and balance thermal power conditions 70. A simple illustrative example of a run of the process set up in FIG. 3 is described with respect to the flowchart of FIG. 4. A determination is made as to whether an application for execution has been received at the hybrid CPU, instruction 71. If Yes, the application is stored 72 and the stored application is statically sampled, instruction 73. A determination is made by the sampling as to whether the sampled application is single threaded 74. If No, the application is not single threaded, i.e. mulithreaded, then, instruction 75, it is run on a first CPU under normal operating conditions. If the determination is Yes, then the bus speed in a second CPU (FIG. 1) is increased 76 and the single threaded application is run on this second CPU 77. The application running on the second CPU is subject to a runtime sampling of the running application 78 to determine if the running application is still single threaded 79. If Yes, the application continues to be run on the second higher speed CPU 81. If No, the application is no longer single threaded 80 the bus ratios on the second CPU are reduced. Alternatively, the now multithreaded application may be transferred to another CPU running at normal bus ratios.

During the running of a hybrid CPU system in accordance with the present invention wherein there are a plurality of CPUs, each implemented in multicored processors, some of which are run at higher speed thermal conditions, i.e. the effects of overheating, can create problems. Accordingly, the system may be monitored for excessive thermal conditions 82. Alternatively, the thermal effects of each increase in the bus ratios in each particular CPU in a hybrid system is predictable. Thus, total effect on the hybrid CPU system is predictable. Accordingly, a determination is continued on the running system as to whether a predetermined level is reached wherein the excessive level has been reached, instruction 83. At that point, if Yes, then some of the CPUs that are running multithreaded applications, e.g. CPU 1, FIG. 1, are run at lower speeds by reducing bus ratios and the process is branched back to instruction 82 via branch B, wherein the monitoring is continued. If the determination in instruction 83 is No, there are no excessive thermal conditions, then the process is returned to instruction 81 via branch A.

As will be appreciated by one skilled in the art, aspects of the present invention may be embodied as a system, method or computer program product. Accordingly, aspects of the present invention may take the form of an entirely hardware embodiment, an entirely software embodiment, including firmware, resident software, micro-code, etc.; or an embodiment combining software and hardware aspects that may all generally be referred to herein as a "circuit", "module" or "system." Furthermore, aspects of the present invention may take the form of a computer program product embodied in one or more computer readable mediums having computer readable program code emobied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus or device, or any suitable combination of the foregoing. More specific examples (a non-exhaustive list) of the computer readable storage medium would include the following: an electrical connection having one or more wires, a portable computer diskette, a hard disk, a Random Access Memory ("RAM"), a Read Only Memory ("ROM"), an Erasable Programmable Read Only Memory ("EPROM" or Flash memory), an optical fiber, a portable compact disc read only memory ("CD-ROM"), an optical storage device, a magnetic storage device or any suitable combination of the foregoing. In the context of this document, a computer readable storage medium may be any tangible medium that can contain or store a program for use by or in connection with an instruction execution system, apparatus or device.

A computer readable medium may include a propogated data signal with computer readable program code embodied therein, for example, in baseband or as part of a carrier wave. Such a propogated signal may take any of a variety of forms, including, but not limited to, electromagnetic, optical, or any suitable combination thereof. A computer readable signal medium may be any computer readable medium that is not a computer readable storage medium and that can commuicate, propogate or transport a program for use by or in connection with an instruction executiom system, apparatus or device.

Program code embodied on a computer readable medium may be transmitted using any appropriate medium, including, but not limited to, wireless, wireline, optical fiber cable, RF, etc., or any suitable combination the foregoing.

Computer program code for carrying out operations for aspects of the present invention may be written in any combination of one or more programming languages, including an object oriented programming language, such as Java, Smalltalk, C++ and the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the later scenario, the remote computer may be connected to the user's computer through any type of network, including a local area network ("LAN") or a wide area network ("WAN"), or the connection may be made to an external computer (for example, through the Internet, using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer or other programmable data processing apparatus to produce a machine, such that instructions, which execute via the processor of the computer or other programmable data processing apparatus, create means for implementing the functions/acts specified flowchart and/or block diagram block or blocks.

These computer program instructions may also be stored in a computer readable medium that can direct a computer, other programmable data processing apparatus or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the Figures illustrate the architecture, functionality and operations of possible implementations of systems, methods and computer program products according to various embodiments of the present invention. In this regard, each block in the flowchart or block diagrams may represent a module segment, or portion of code, which comprises one or more executable instructions for implementing the specified logical function(s). It should be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations can be implemented by special purpose hardware-based systems that perform the specified functions or acts, or combinations of special purpose hardware and computer instructions.

Although certain preferred embodiments have been shown and described, it will be understood that many changes and modifications may be made therein without departing from the scope and intent of the appended claims.

What is claimed is:

1. A method for optimizing the performance of application programs in hybrid CPU systems having a plurality of different CPUs comprising:
    loading an application program into a hybrid CPU system;
    sampling said loaded application program, carried out as static analysis of the threads in the application program, to determine whether the application program is single threaded or multithreaded;
    running a multithreaded application program on a first CPU;
    running a single threaded application program on a second CPU, having the same performance capacity as the first CPU;
    wherein said second CPU is run at a higher speed than said first CPU in response to said carrying out of said static analysis;
    sampling the running application program to determine if the single or multithread type of the application has changed; and
    changing the CPU on which the application is being run responsive to a thread type change.

2. The method of claim 1 wherein the running speed of the second CPU is increased by increasing bus ratios in said second CPU.

3. The method of claim 1 wherein:
    said hybrid CPU system comprises a plurality of CPUs of the same performance capacity including said first and second CPUs; and
    further including reducing the speed of a CPU on which a multithreaded application program is run by reducing bus ratios in the CPU.

4. The method of claim 3 further including:
    predicting thermal power conditions of the hybrid CPU system; and
    reducing bus ratios in said CPU on which said multithreaded application is being run responsive to said monitoring.

5. A system for optimizing the performance of application programs in hybrid CPU systems having a plurality of different CPUs, said system comprising:
    a processor; and
    a computer memory holding computer program instructions which when executed by the processor perform the method comprising:
    loading an application program into a hybrid CPU system;
    sampling said loaded application program carried out as static analysis of the threads in the application program, to determine whether the application program is single threaded or multithreaded;
    running a multithreaded application program on a first CPU;
    running a single threaded application program on a second CPU, having the same performance capacity as the first CPU;
    wherein said second CPU is run at a higher speed than said first CPU in response to said carrying out of said static analysis;
    sampling the running application program to determine if the single or multithread type of the application has changed; and
    changing the CPU on which the application is being run responsive to a thread type change.

6. The system of claim 5 wherein the running speed of the second CPU is increased by increasing bus ratios in said second CPU.

7. The system of claim 5 wherein:
said hybrid CPU system comprises a plurality of CPUs of the same performance capacity including said first and second CPUs; and
said performed method further includes reducing the speed of a CPU on which a multithreaded application program is run by reducing bus ratios in the CPU.

8. The system of claim 7, wherein said performed method further includes:
predicting thermal power conditions of the hybrid CPU system; and
reducing bus ratios in said CPU on which said multithreaded application is being run responsive to said monitoring.

9. A non-transitory computer usable storage medium having stored thereon a computer readable program for optimizing the performance of application programs in hybrid CPU systems having a plurality of different CPUs, wherein the computer readable program when executed on a computer causes the computer to:
load an application program into a hybrid CPU system;
sample said loaded application program, carried out as static analysis of the threads in the application program, to determine whether the application program is single threaded or multithreaded;
run a multithreaded application program on a first CPU;
run a single threaded application program on a second CPU, having the same performance capacity as the first CPU;
wherein said second CPU is run at a higher speed than said first CPU, in response to said carrying out of said static analysis;
sample the running application program to determine if the single or multithread type of the application has changed; and
change the CPU on which the application is being run responsive to a thread type change.

10. The computer usable medium of claim 9, wherein the running speed of the second CPU is increased by increasing bus ratios in said second CPU.

11. The computer usable medium of claim 9 wherein:
said hybrid CPU system comprises a plurality of CPUs of the same performance capacity including said first and second CPUs; and
the computer program when executed on a computer further causes the computer to reduce the speed of a CPU on which a multithreaded application program is run by reducing bus ratios in the CPU.

12. The computer usable medium of claim 11, wherein said computer program when executed on a computer further causes the computer to:
predict thermal power conditions of the hybrid CPU system; and
reduce bus ratios in said CPU on which said multithreaded application is being run responsive to said monitoring.

* * * * *